US009100913B2

(12) United States Patent
Kim et al.

(10) Patent No.: US 9,100,913 B2
(45) Date of Patent: Aug. 4, 2015

(54) METHOD AND APPARATUS FOR OPTIMIZING POWER CONSUMPTION OF A TERMINAL IN A MOBILE COMMUNICATION SYSTEM

(75) Inventors: Sang Bum Kim, Seoul (KR); Soeng Hun Kim, Gyeonggi-do (KR); Kyeong In Jeong, Gyeonggi-do (KR); Jung Soo Jung, Gyeonggi-do (KR); Joon Young Cho, Gyeonggi-do (KR); Gert Jan Van Lieshout, Middlesex (GB); Himke Van Der Velde, Middlesex (GB); Boon Loong Ng, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 115 days.

(21) Appl. No.: 13/885,652

(22) PCT Filed: Nov. 15, 2011

(86) PCT No.: PCT/KR2011/008707
§ 371 (c)(1),
(2), (4) Date: May 15, 2013

(87) PCT Pub. No.: WO2012/067406
PCT Pub. Date: May 24, 2012

(65) Prior Publication Data
US 2013/0235780 A1   Sep. 12, 2013

Related U.S. Application Data

(60) Provisional application No. 61/413,914, filed on Nov. 15, 2010, provisional application No. 61/484,645, filed on May 10, 2011.

(51) Int. Cl.
*H04W 52/02*   (2009.01)
*H04W 76/04*   (2009.01)

(52) U.S. Cl.
CPC ...... *H04W 52/0212* (2013.01); *H04W 52/0203* (2013.01); *H04W 52/0216* (2013.01); *H04W 76/048* (2013.01); *Y02B 60/50* (2013.01)

(58) Field of Classification Search
None
See application file for complete search history.

(56) References Cited

U.S. PATENT DOCUMENTS 6,829,227 B1 * 12/2004 Pitt et al. .................. 370/329
8,023,467 B2 *  9/2011 Wu et al. ................... 370/331

(Continued)

FOREIGN PATENT DOCUMENTS

EP        1973355 A1 *  9/2008
KR   10-2007-0092102      9/2007

(Continued)

OTHER PUBLICATIONS

International Search Report dated May 29, 2012 in connection with International Patent Application No. PCT/KR2011/008707.
Written Opinion of International Searching Authority dated May 29, 2012 in connection with International Patent Application No. PCT/KR2011/008707.

*Primary Examiner* — Christopher Crutchfield

(57) ABSTRACT

The present invention relates to a method and to an apparatus for optimizing the power consumption of a terminal in a mobile communication system. The method for optimizing power consumption of a terminal in a mobile communication system comprises: a determination step of determining whether there is a need for changing a configuration for a discontinuous reception operation of the terminal; and a transmission step of transmitting, to a base station, a request message for a change in the discontinuous reception operation, if it is determined that the change is needed.

16 Claims, 6 Drawing Sheets

(56) References Cited

U.S. PATENT DOCUMENTS

| | | | |
|---|---|---|---|
| 8,094,595 B2 * | 1/2012 | Montojo et al. | 370/311 |
| 8,743,802 B2 * | 6/2014 | Anderson et al. | 370/329 |
| 2008/0167089 A1 * | 7/2008 | Suzuki et al. | 455/574 |
| 2010/0144299 A1 * | 6/2010 | Ren | 455/226.1 |
| 2011/0211466 A1 * | 9/2011 | Kazmi | 370/252 |
| 2012/0106424 A1 * | 5/2012 | Davies et al. | 370/311 |
| 2012/0113905 A1 * | 5/2012 | Anderson et al. | 370/329 |

FOREIGN PATENT DOCUMENTS

| | | |
|---|---|---|
| KR | 10-2008-0065886 | 7/2008 |
| KR | 10-2009-0031181 | 3/2009 |
| KR | 10-2009-0117789 | 11/2009 |

* cited by examiner

FIG. 3
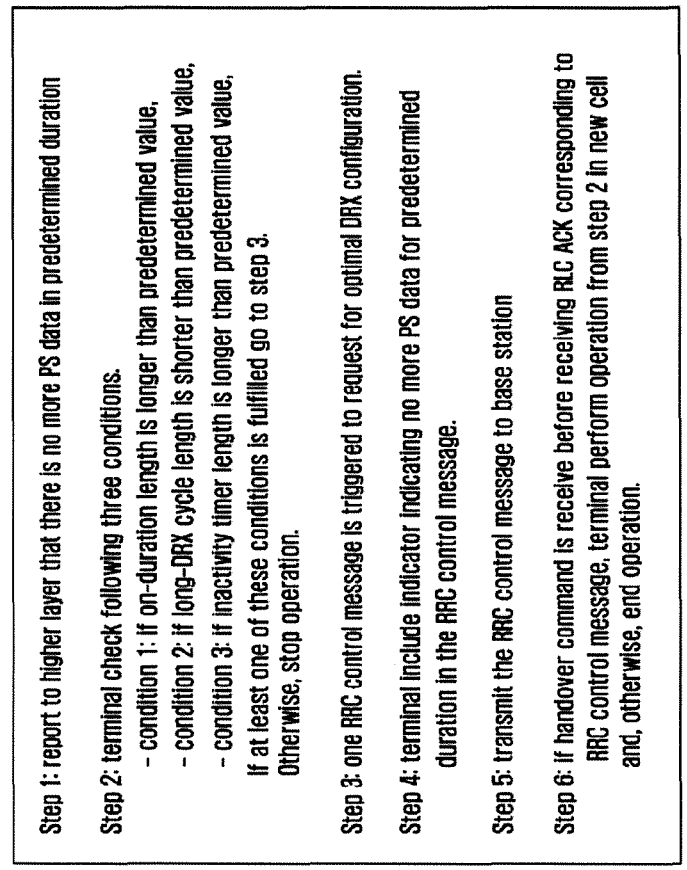
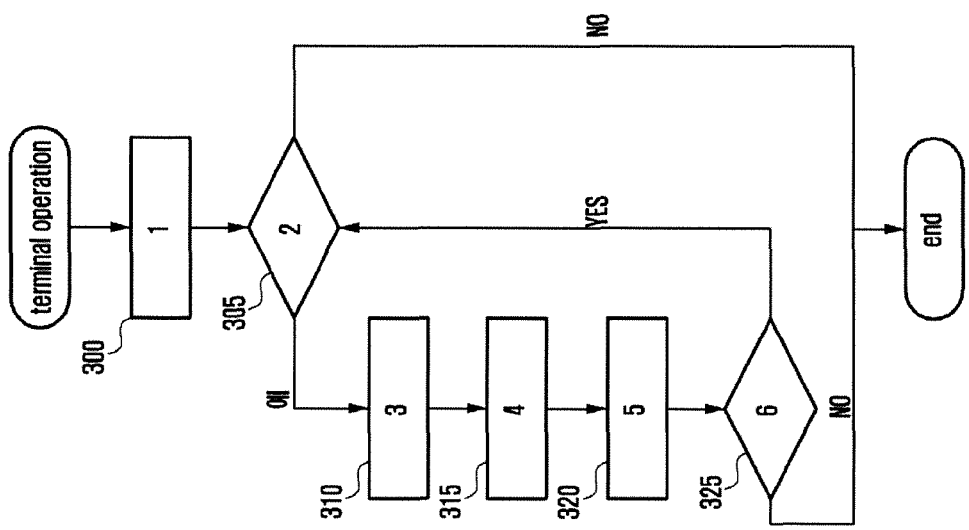

METHOD AND APPARATUS FOR OPTIMIZING POWER CONSUMPTION OF A TERMINAL IN A MOBILE COMMUNICATION SYSTEM

CROSS-REFERENCE TO RELATED APPLICATION(S)

The present application claims priority under 35 U.S.C. §365 to International Patent Application No. PCT/KR2011/008707 filed Nov. 15, 2011, entitled "METHOD AND APPARATUS FOR OPTIMIZING POWER CONSUMPTION OF A TERMINAL IN A MOBILE COMMUNICATION SYSTEM". International Patent Application No. PCT/KR2011/008707 claims priority under 35 U.S.C. §365 and/or 35 U.S.C. §119(a) to U.S. Provisional Application Nos. 61/413,914 filed Nov. 15, 2010 and 61/484,645 filed May 10, 2011 and which are incorporated herein by reference into the present disclosure as if fully set forth herein.

BACKGROUND OF THE INVENTION

1. Field of the Invention

The present invention relates to a mobile communication system and, in particular, to a method and apparatus for optimizing power consumption of a terminal in the mobile communication system.

2. Description of the Related Art

Typically, the mobile communication system has been developed for the user to communicate on the move. With the rapid advance of technologies, the mobile communication system has evolved to the level capable of providing high speed data communication service as well as voice communication service.

Recently, as one of the next generation mobile communication system, Long Term Evolution (LTE) is on the standardization by the 3$^{rd}$ Generation Partnership Project (3GPP). LTE is a technology designed to provide high speed packet-based communication of up to 100 Mbps and aims at commercial deployment around 2010 timeframe. In order to accomplish the aim, a discussion is being held on several schemes: one scheme for reducing the number of nodes located in a communication path by simplifying a configuration of the network, and another scheme for maximally approximating wireless protocols to wireless channels.

Meanwhile, unlike voice service, the data service is provided on the resource determined according to the data amount to be transmitted and channel condition. Accordingly, the wireless communication system, especially cellular communication, is provided with a scheduler manages transmission resource allocation in consideration of the required resource amount, channel condition, data amount, etc. This is the fact in the LTE system as the next generation mobile communication system, and the scheduler located at the base station manages the transmission resource allocation.

More recently, discussions are focused on LTE-advanced (LTE-A) evolved from LTE with the adaptation of various novel techniques. In Release 11, Diverse Data Application (DDA) has been introduces as a part of Work Item (WI) for reducing power consumption of the terminal. In association with the WI, various studies are being conducted in order to optimize the power consumption of the terminal.

DISCLOSURE OF INVENTION

Technical Problem

The present invention proposes a method for optimizing the power consumption of a terminal, and it is an object of the present invention to provide a method and apparatus for changing discontinuous reception operation settings efficiently according to the traffic properties in the radio communication system supporting various data traffics so as to optimize the power consumption of the terminal.

Solution to Problem

In order to solve the above problem, a power consumption optimization method of a terminal in a mobile communication system includes determining whether a discontinuous reception configuration of the terminal is necessary to be changed; and transmitting, when necessary to be changed, a discontinuous reception configuration change request message to a base station.

Also, a terminal for optimizing power consumption in a mobile communication system includes a transceiver which transmits and receives data or control signals to and from a base station; and a controller which controls determining whether a discontinuous reception configuration of the terminal is necessary to be changed and transmitting, when necessary to be changed, a discontinuous reception configuration change request message to a base station.

Advantageous Effects

According to the present invention, in the radio communication system supporting various data traffics, it is possible to change the DRX configuration efficiently so as to optimize power consumption of the terminal according to the traffic property.

BRIEF DESCRIPTION OF THE DRAWINGS

FIG. 3 is a flowchart illustrating detailed operation procedure of the first embodiment of the present invention.

DETAILED DESCRIPTION OF EXEMPLARY EMBODIMENTS

In the LTE system, Discontinuous Reception (DRX) is adopted to minimize power consumption of the terminal. The terminal usually has to monitor the channel to detect the data addressed to it. However, if the user monitors the channel always, this causes significant power consumption. Accordingly, there is a room for reducing the power consumption of the UE in such a way that the terminal monitors the channel to detect data for predetermined duration. This is referred to as DRX, and FIG. 1 shows a DRX operation procedure.

Figure 1:
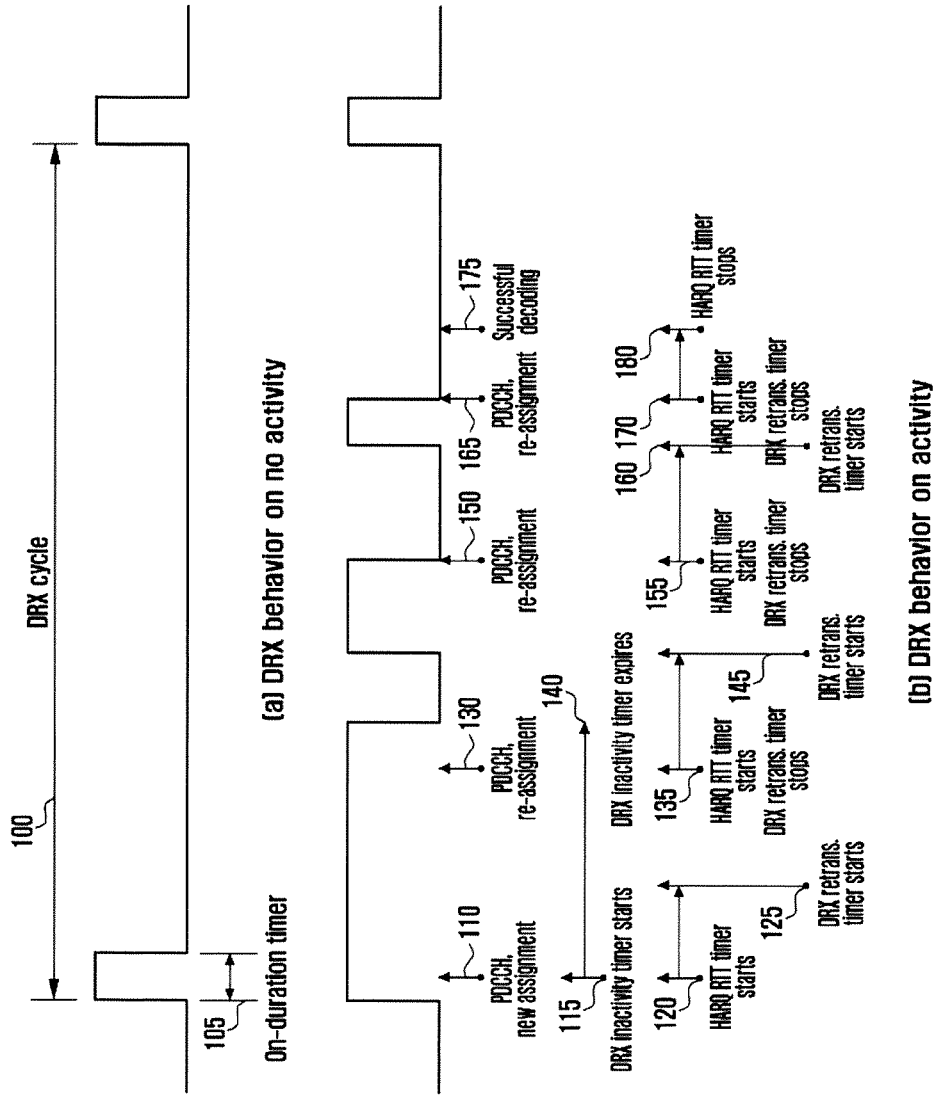
FIG. 1 is a flowchart illustrating the DRX operation procedure of the terminal.

FIG. 1 is a flowchart illustrating the DRX operation procedure of the terminal.

Part (a) of FIG. 1 shows the operation of the terminal in the case of no receipt of data. The terminal monitors Physical Downlink Control Channel (PDCCH) as a downlink control channel only in duration occurring periodically but not always. This period is referred to as DRX cycle 100, and the PDCCH monitoring is limited to the DRX cycle using an on-duration timer 105. That is, the on-duration timer starts at every DRX cycle such that the terminal monitors PDCCH until the time expires.

In this case, the DRX cycle and the on-duration timer value is notified to the terminal through a dedicated Radio Resource Control (RRC) message. The base station knows the DRX cycle and on-duration timer value of each terminal and, if data addressed a certain terminal, sends the scheduling information for the corresponding terminal on PDCCH for the time duration of on-duration timer. If PDCCH carries the scheduling information addressed to one terminal, DRX operates for the terminal to expand the time for monitoring the channel with multiple timers.

Part (b) of FIG. 1 shows the DRX operation in the case that new scheduling information is carried on PDCCH. If the scheduling information for the corresponding terminal is carried on PDCCH for the on-duration of the terminal as denoted by reference number 110, the terminal starts the DRX inactivity timer 115 and retransmission timer (HARQ RTT timer) 120. The active time of the terminal is expanded in the duration while the DRX inactivity timer is running. That is, while the DRX inactivity timer is running, the terminal continues monitoring PDCCH. If not scheduling information is carried on PDCCH, the HARQ RTT time starts. There is no need for the terminal to monitor the PDCCH before receiving new scheduling information for retransmission after transmitting a NACK corresponding to the data transmitted by the base station. Accordingly, the terminal refrains from monitoring PDCCH for the duration while the HARQ RTT timer is active. That is, the HARQ RTT timer value is determined in consideration of the Round Trip Time in HARQ operation. However, the other timers, i.e. DRX inactivity timer and on-duration timer are running, the terminal stays in active state although the HARQ RTT timer is active.

If the HARQ RTT timer has expired and the soft buffer data have not been decoded successfully, the DRX retransmission timer 125 starts. If the corresponding DRX retransmission timer starts, the terminal stays in active state. If scheduling information is received again before the expire of the DRX retransmission timer as denoted by reference number 130, the terminal starts HARQ RTT timer and stops the currently running DRX retransmission timer as denoted by reference number 135. Since the DRX inactivity timer stops as denoted by reference number 140 and only the HARQ RTT timer is running, the terminal leaves the active state. If the HARQ RTT timer expires without decoding the data successfully, the DRX retransmission timer starts as denoted by reference number 145. If scheduling information arrives before the expiry of the DRX retransmission timer as denoted by reference number 150, the HARQ RTT timer starts and the DRX retransmission timer stops as denoted by reference number 155. If the data in the soft buffer are decoded successfully as denoted by reference number 175, the currently running HARQ RTT timer stops.

Meanwhile, although DRX make it possible to reduce power consumption of the terminal, there is a room for reducing the power consumption more efficiently by adjusting the DRX operation and configuration values dynamically. By taking notice of this, the present invention proposes a method for reducing the power consumption efficiently.

Figure 2:
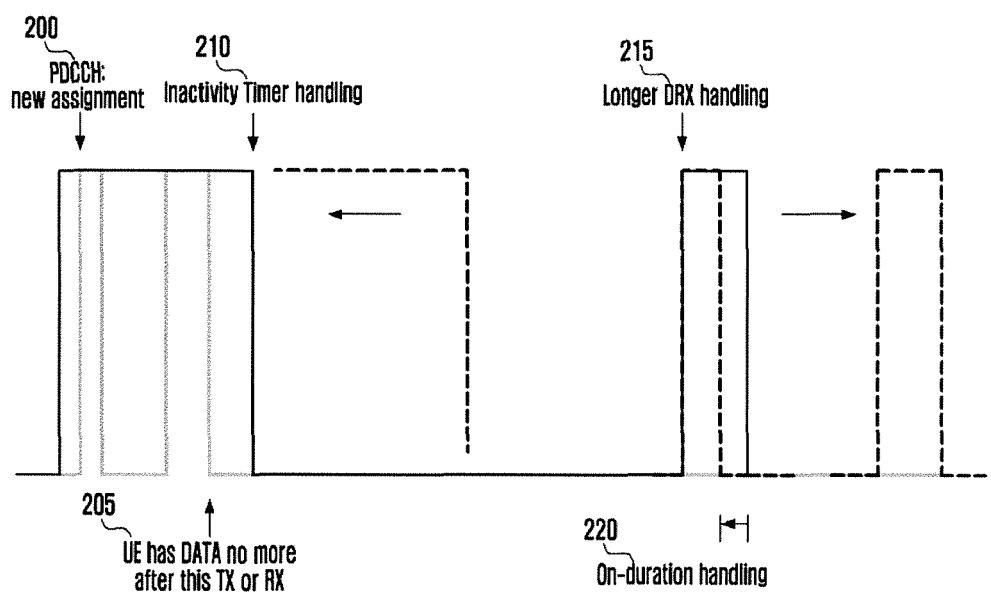
FIG. 2 is a diagram illustrating an enhanced DRX method for reducing the power consumption of the terminal according to an embodiment of the present invention.

FIG. 2 is a diagram illustrating an enhanced DRX method for reducing the power consumption of the terminal according to an embodiment of the present invention.

First, the terminal receives scheduling information from the base station as denoted by reference number 200. If it is determined that there is no more data to be transmitted/received as denoted by reference number 205, the terminal stops the DRX inactivity timer, which has started at the timing 200, before expiry and configure the next DRX cycle to be longer as denoted by reference number 125 or applying shorter on-duration as denoted by reference number 220 to reduce power consumption further.

In order to accomplish this operation, there is a need of a mechanism for the terminal to notify the base station of the current terminal traffic condition and unavailability of the current DRX configuration. Also, there is a need of a mechanism for transmitting DRX configuration for more power conservation to the terminal efficiently. The present invention proposes such mechanisms.

The conventional DRX configuration can be classified into one of two levels depending on the situation. That is, the two configurations of short DRX and long DRX are sent to the terminal through RRC connection reconfiguration message in advance. The long DRX has the DRX cycle longer than that of the short DRX while the timer-related configuration values are not differentiated between the long and short DRXs. The default configuration is the long DRX and, if the short DRX is required, the short DRX is triggered with Media Access Control (MAC) CE. The short DRX is changed for the long DRX automatically after being applied for predetermined time duration.

Accordingly, by taking notice of the power conservation mode, it is not appropriate for applying the conventional DRX configuration from various viewpoints.

In order to enhance the power conservation effect, it is necessary to adjust the DRX inactivity timer and on-duration timer depending on the situation as wells as the DRX cycle as described above.

The conventional DRX mechanism allows the base station to trigger the change from the long DRX to the short DRX, but the change from the short DRX to the long DRX depends on a timer. In order to save power, however, it should be allowed for switching the short DRX to the long DRX or a longer DRX for more power saving at a wanted time.

Finally, the conventional DRX mechanism depends on the determination of the base station without input from the terminal in switching between the DRX configurations. However, there is a need of the data traffic condition of the terminal in order to accomplish the efficient poser conservation effect.

Descriptions are made of the methods for reducing power consumption according to the first to third embodiments of the present invention hereinafter. In the first embodiment, a description is made of the method for triggering an RRC message, i.e. DRX configuration change request message, transmitted from a terminal to a base station. In the second and third embodiments, descriptions are made of the methods for determining DRX configuration value minimizing power consumption and requesting for changing DRX configuration. The second and third embodiments are similar to each other with the exception in the procedure of transmitting the DRX configuration change request message to the base station.

First Embodiment

In the first embodiment of the present invention, a description is made of the method for the terminal to trigger a RRC message requesting for change of DRX, i.e. DRX configuration change request message, to be transmitted to the base station.

FIG. 3 is a flowchart illustrating detailed operation procedure of the first embodiment of the present invention.

First, the terminal receives, from a higher layer, a report informing that there is no more data to be transmitted to the base station at step 300. The terminal determines whether DRX configuration change is necessary for reduction of power consumption based on a few conditions at step 305. For example, the following three conditions may be considered.

- The length of on-duration is longer than a predetermined threshold value?
- The long DRX cycle is shorter than a predetermined threshold value?
- The DRX inactivity length is longer than a predetermined threshold?
- If at least one of the three conditions is not fulfilled, it is determined that DRX change is necessary for reducing power consumption. In this case, the terminal triggers an RRC control message, i.e. DRX configuration change request message at step 310. An indicator indicating that there is no more data to be transmitted by the terminal is included in the RRC control message at step 315.

Next, the terminal sends the base station the DRX configuration request message at step 320.

Meanwhile, if a handover command is received before the receipt of a DRX configuration change response message (RLC ACK) corresponding to the RRC message at step 325, the terminal performs step 305 again in a new cell. Otherwise, if the DRX configuration change response message is received from the base station, the terminal ends the DRX configuration request procedure.

Second Embodiment

In the second embodiment of the present invention, a description is made of the method for determining DRX configuration value for power consumption minimization and requesting change of the DRX configuration. Particularly, a Signaling Connection Release Indication (SCRI) message transmitted by the terminal is delivered through an uplink data channel (e.g. MAC CE). The SCRI message is used to request for change of the DRX configuration value for minimizing power consumption when there is no more data to be transmitted by the terminal. In the following description, the term 'SCRI' is interchangeable used with the term 'DRX configuration change request message."

Figure 4:
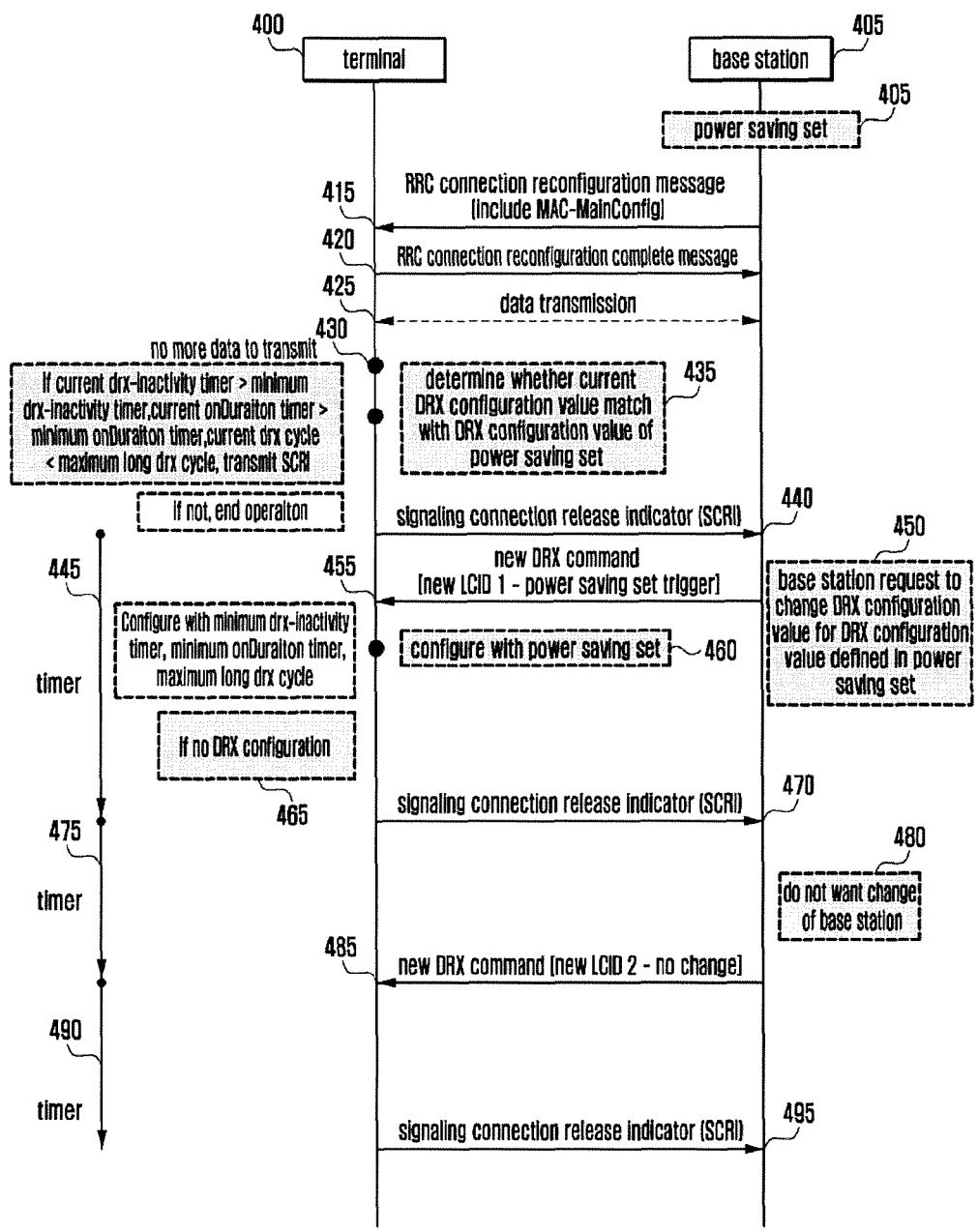
FIG. 4 is a signal flow diagram illustrating the power consumption method of the terminal according to the second embodiment of the present invention.

FIG. 4 is a signal flow diagram illustrating the power consumption method of the terminal according to the second embodiment of the present invention.

The base station 405 sets a DRX configuration value for minimizing the power consumption of the terminal at step 410. This is to define a DRX configuration for power conservation with DRX inactivity timer, DRX cycle, and on-duration timer in the range of values tolerable in the system, and this is referred to as Power Serving Set in an embodiment of the present invention. For example, the Power Serving Set may be provided with the shortest DRX inactivity timer value, longest DRX cycle value, and shortest on-duration timer value capable of being provided in the system.

Next, the base station sends the terminal 400 the Power Saving Set using the dedicated RRC message, i.e. RRC connection reconfiguration message, at step 415. In response to the Power Saving Set, the terminal sends the base station an RRC connection reconfiguration complete message at step 420.

The terminal and the base station communicate data to each other at step 425. If there is no more data to transmit at step 430, the terminal compares the current DRX configuration value with the Power Serving Set value received previously from the base station at step 435.

If at least one currently configured DRX configuration values, i.e. DRX inactivity timer value, DRX cycle value, and on-duration timer value, mismatch the Power Saving Set, the terminal determines that it is necessary to adjust the current DRX configuration value. At this time, the terminal sends the base station a DRX configuration change request message (i.e. SCRI message) at step 440. The DRX configuration change request message (SCRI) transmission condition is fulfilled when the terminal has no more data to be transmitted and when it is necessary to compare the previous Power Saving Set and the current DRX configuration or the more efficient DRX configuration is required as compared to the current DRX configuration. Also, the DRX configuration change request message may be transmitted when the terminal is not scheduled for a predetermined time.

With the transmission of the DRX configuration change request message (SCRI message), an SCRI timer starts. The SCRI timer may be used as DRX configuration change request message retransmission condition.

Upon receipt of the DRX configuration change request message (SCRI), the base station determines that the terminal's DRX configuration values are required to be changed to the Power Saving Set values at step 450. Accordingly, the base station sends the terminal a DRX configuration change response message indicating change of the DRX configuration values to the power saving set in the MAC CE at step 455. In order to accomplish this, a new MAC CE has to be defined. Also, it is necessary to define a new LCID to identify the new MAC CE.

Upon receipt of the DRX configuration change response message from the base station, the terminal sets the terminal's DRX configuration values to the Power Saving Set values, at step 460, using the Power Saving Set configuration information received from the base station previously.

Meanwhile, the terminal may not receive the DRX configuration change response message from the base station at step 465 until the timer started at step 445 expires. If the terminal is not configured with the Power Saving Set before the expiry of the timer, the terminal retransmits the DRX configuration change request message (SCRI) to the base station at step 470. At this time, the corresponding timer restarts at step 475.

In this way, the DRX configuration change request message (SCRI) retransmission is determined based on the timer. That is, if it fails to change for the Power Saving Set until the timer expires, the SCRI is retransmitted. If it is determined to refrain from change at step 480, the base station sends the terminal a MAC CE indicating the related DRX command at step 485. Here, it is possible to stop the timer or restart the timer at step 490. If the timer expires again at step 495, the terminal may retransmit the SCRI message. As the SCRI retransmission condition, the timer stops or restarts when scheduling information is received or when SR occurs. If the scheduling information is received or SR occurs, the SCRI message transmission is suspended because it is inappropriate to configure with the power saving set.

Third Embodiment

In the third embodiment of the present invention, a description is made of the method for determining DRX configuration value for power consumption minimization and requesting change of the DRX configuration. The third embodiment is similar to the second embodiment with the exception that the Signaling Connection Release Indication (SCRI) transmitted by the terminal is delivered in a control message, i.e. RRC message. In the following description, the term 'SCRI' is interchangeable used with the term 'DRX configuration change request message."

Figure 5:
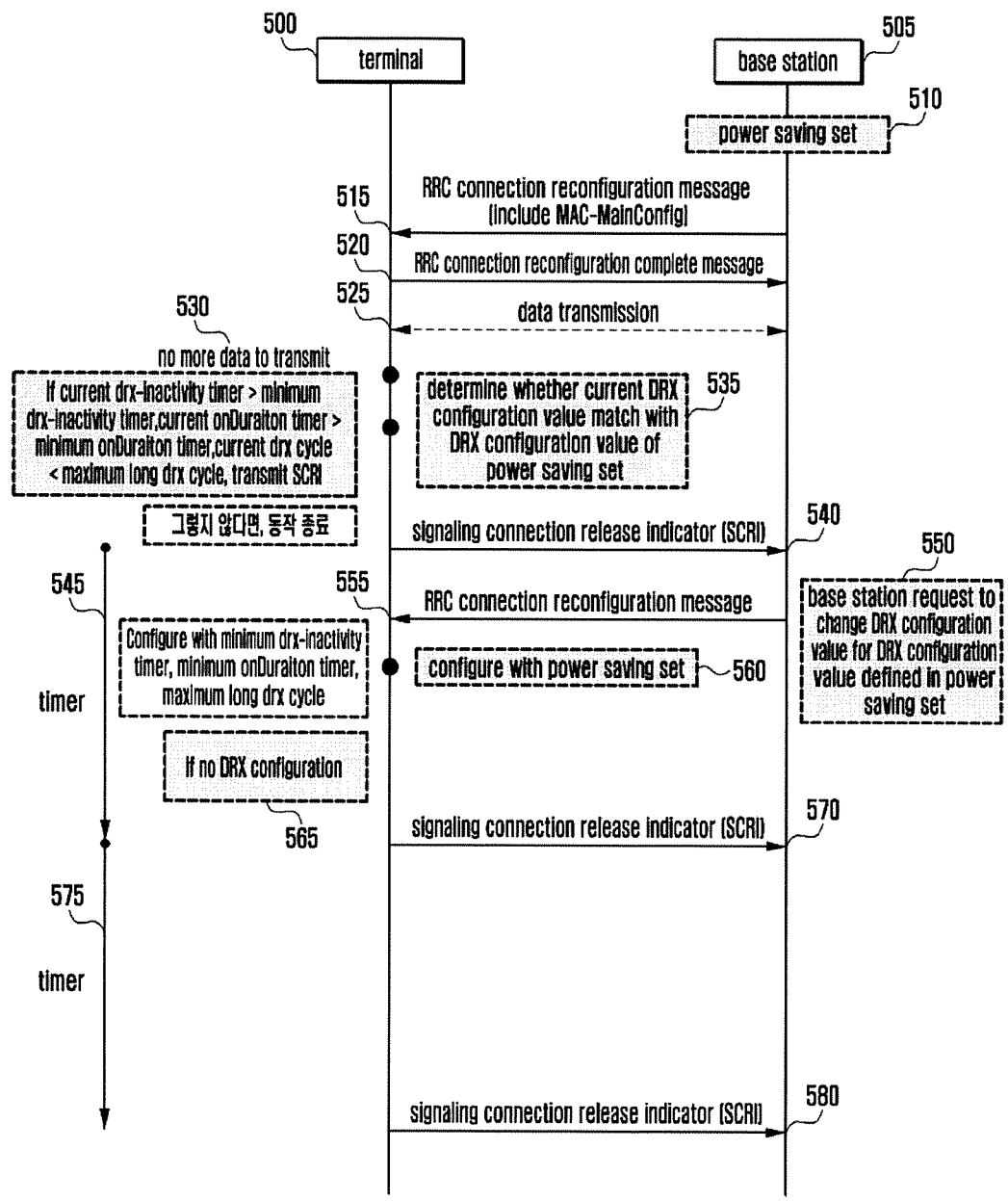
FIG. 5 is a signal flow diagram illustrating the operation procedure of the third embodiment.

FIG. 5 is a signal flow diagram illustrating the operation procedure of the third embodiment.

Steps 510 to 545 of FIG. 5 are identical with steps 410 to 445 of FIG. 4. If it is determined that the terminal's Power Saving Set is necessary to be changed at step 550, the base station sends the terminal a dedicated RRC message, i.e. RRC connection Reconfiguration (RRCConnectionReconfiguration) message at step 555. The RRC connection Reconfiguration (RRCConnectionReconfiguration) may include only the indicator indicating to change the terminal's DRX configuration values for the power saving set values store in the terminal previously or newly configure DRX configuration information. The RRC Connection Reconfiguration message may make it possible for the base station to perform control flexibly in adaptation to the situation.

Figure 6:
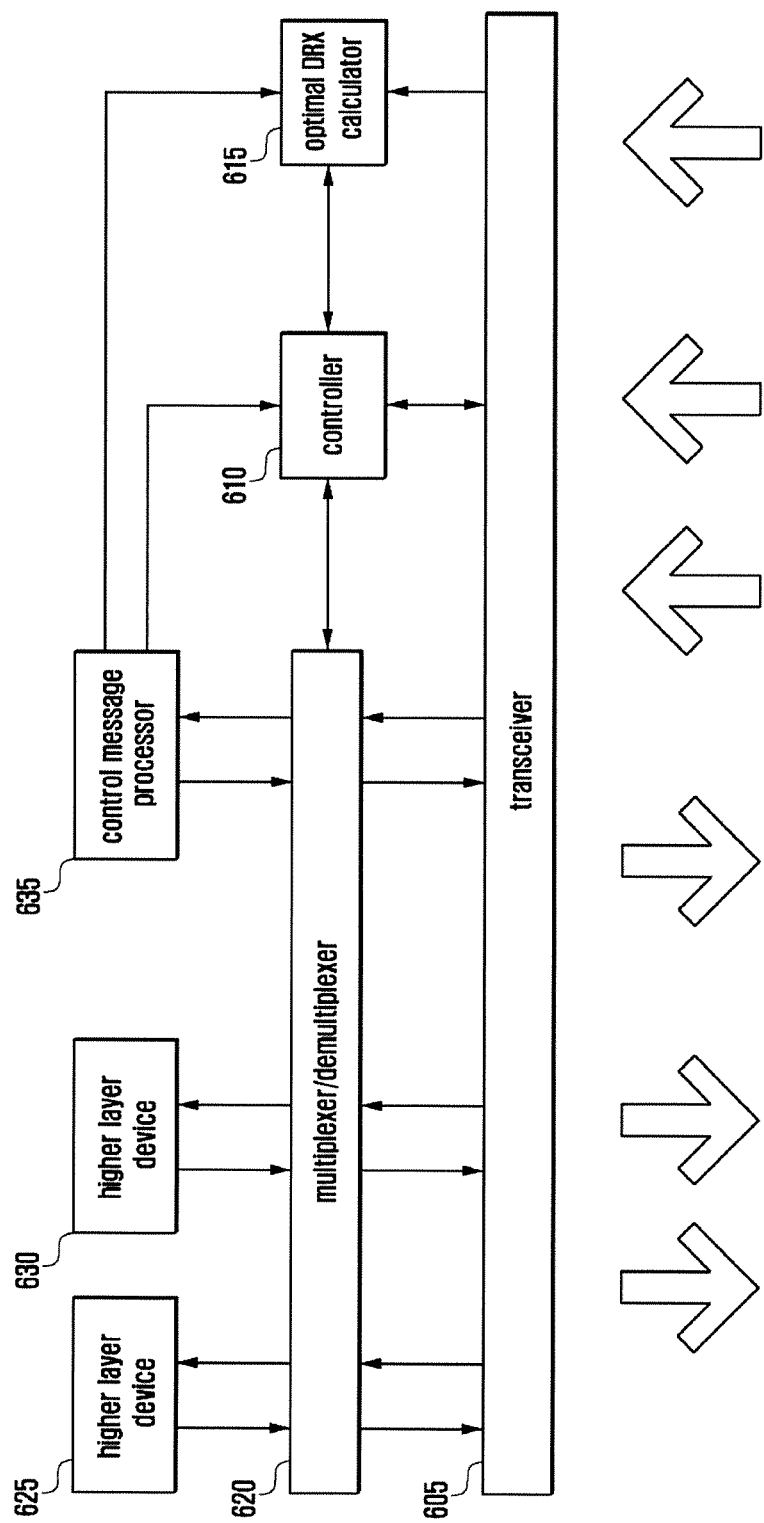
FIG. 6 is a block diagram illustrating the configuration of the terminal according to an embodiment of the present invention.

FIG. 6 is a block diagram illustrating the configuration of the terminal according to an embodiment of the present invention.

The terminal includes a transceiver 650, a DRX calculator 615, a controller 610, a multiplexer/demultiplexer 620, a control message processor 635, and various higher layer devices 635 and 630.

The transceiver 650 receives data and predetermined control signals on downlink carriers and transmits data and predetermined control signals on uplink carriers.

The control unit 610 controls overall operations for optimizing power consumption of the terminal and signal flows among the function blocks.

In more detail, the control unit 610 instructs the multiplexer/demultiplexer 620 to generate MAC PDU according to the control signal, i.e. the scheduling information indicated in the uplink grant, provided by the transceiver 650. The control unit determines whether to change DRX configuration and, if it is necessary to change DRX configuration, instructs the optimal DRX calculator 615 to calculate optimal DRX configuration value. Whether to change DRX is determined based on the SCRI message sent by the control message processor 635. The control unit 610 controls the multiplexer/demultiplexer 620 such that the scheduling information is transmitted according to the DRX cycle. The control unit 610 transmits the optimal DRX configuration value provided by the DRX calculator 615 to the multiplexer/demultiplexer. The optimal DRX calculator 615 calculates the optimal DRX configuration value and sends it to the controller 610 under the control of the controller 610. The DRX configuration value is processed so as to be transmitted to the terminal by means of the control message processor 635.

The multiplexer/demultiplexer 620 multiplexes the data generated by the higher layer device 625 and the control message processor 635 or demultiplexes the data received by means of the transceiver to deliver the demultiplexed data to appropriate higher layer device 625 or the control message processor 635.

The control message processor 630 processes the control message transmitted by the network and takes a necessary action. For example, the control message processor 635 may send the PHR parameter contained in the control message to the controller 610 or send the newly activated carriers information to the transceiver 605 such that the transceiver is configured with the carriers. The higher layer device 625 may be established per service and process the data generated by user service such as FTP or VoIP to the multiplexer or process the data from the demultiplexer 620 to the higher layer service application.

Although the description is directed to the case where the terminal consists of separate blocks responsible for different functions, this is just an example but not limited to the separated function block configuration. For example, the controller 610 may perform all the above-described functions by itself.

In detail, the controller 610 may determine that it is necessary to change DRX configuration of the terminal and control to transmit a DRX configuration change request message to the base station.

In this case, according to the first embodiment of the present invention, if the length of on duration is long than a predetermined threshold, if the long DRX cycle is shorter than a predetermined threshold, or if the DRX inactivity length is longer than a predetermined threshold, the controller 610 determines that there is a need of changing the DRX configuration. The DRX configuration change request message may include an indicator indicating that the terminal has no more data to transmit.

Meanwhile, in the first embodiment of the present invention, a handover command is received before receiving the ACK message corresponding to the DRX configuration change request message from the base station, the control unit may perform handover to determine whether the DRX configure has to be changed in the new cell.

In the case of the second embodiment of the present invention, the control unit 610 may control to receive a Power Saving Set including at least one DRX configuration value from the base station. The Power Saving Set may include at least one of a DRX inactivity timer value, a DRX cycle value, and an on-duration timer value.

In the case that there is no data to be transmitted to the base station, the control unit 610 may compare the current DRX configuration value with the configuration value contained in the Power Saving Set. If at least one configuration value mismatch, the control unit 610 may trigger transmission of DRX configuration change request message to the base station.

In this case, the DRX configuration change request message is transmitted to the base station in a MAC CE through a data channel in the second embodiment and in an RRC message through a control channel.

If a DRX configuration change response message is received from the base station, the control unit 610 controls to change the DRX configuration value of the terminal with the configuration information of the Power Saving Set carried in the message.

The invention claimed is:

1. A method to provide power consumption information by a terminal in a mobile communication system, the method comprising:
   receiving, from a base station, radio resource control (RRC) configuration information configured to provide power saving information;
   determining whether current power saving information is different from previous power saving information;
   determining whether a timer associated with an RRC message is running; and
   transmitting, if the current power saving information is different from the previous power saving information and the timer is not running, the RRC message to the base station.

2. The method of claim 1, wherein the timer starts or restarts if the RRC message is transmitted.

3. The method of claim 1, further comprising:
determining to transmit the RRC message if the terminal has no data to be transmitted.

4. The method of claim 1, wherein the RRC message comprises current preferred power saving information.

5. The method of claim 4, wherein the power saving information includes at least one of a predetermined discontinuous reception inactivity timer value, a discontinuous reception cycle value, and an on-duration timer value.

6. The method of claim 1, wherein the terminal is connected to the base station by a handover.

7. The method of claim 1, further comprising:
receiving a response message of the RRC message from the base station; and
changing power saving configuration of the terminal using power saving information included in the response message.

8. The method of claim 1, wherein transmitting the RRC message to the base station comprises transmitting the RRC message to the base station on a data channel.

9. A terminal configured to provide power consumption in a mobile communication system, the terminal comprising a controller configured to:
control a reception of radio resource control (RRC) configuration information from a base station, wherein the RRC configuration information is configured to provide power saving information,
determine whether current power saving information is different from previous power saving information,
determine whether a timer associated with an RRC message is running, and
control a transmission of the RRC message to the base station if the current power saving information is different from the previous power saving information and the timer is not running.

10. The terminal of claim 9, wherein the timer starts or restarts if the RRC message is transmitted.

11. The terminal of claim 9, wherein the controller is configured to control the transmission of the RRC message if the terminal has no data to be transmitted.

12. The terminal of claim 9, wherein the RRC message comprises current preferred power saving information.

13. The terminal of claim 12, wherein the power saving information comprises at least one of a predetermined discontinuous reception inactivity timer value, a discontinuous reception cycle value, and an on-duration timer value.

14. The terminal of claim 9, wherein the terminal is connected to the base station by a handover.

15. The terminal of claim 9, wherein the controller is further configured to control a reception of a response message from the base station in response to the RRC message and change a power saving configuration of the terminal using power saving information included in the response message.

16. The terminal of claim 9, wherein the controller is configured to transmit the RRC message to the base station on a data channel.

* * * * *